Sept. 9, 1952  P. F. SHIVERS  2,609,615
GYROSCOPIC INSTRUMENT
Filed Sept. 26, 1945  2 SHEETS—SHEET 1

INVENTOR.
PAUL F. SHIVERS
BY
George H. Fisher
ATTORNEY

Sept. 9, 1952　　　　P. F. SHIVERS　　　　2,609,615
GYROSCOPIC INSTRUMENT
Filed Sept. 26, 1945　　　　　　　　　　　　2 SHEETS—SHEET 2
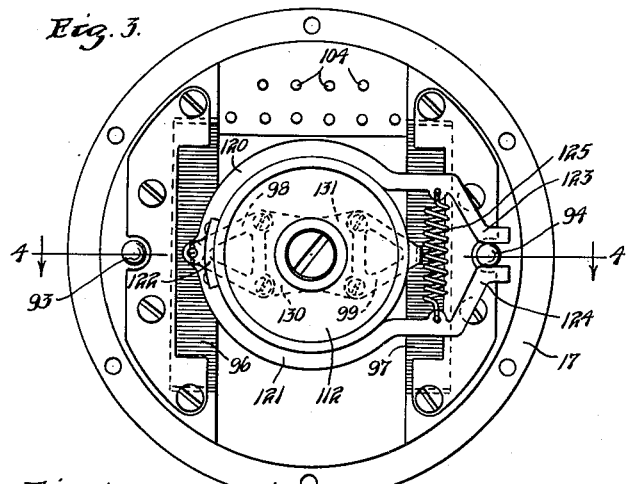
Fig. 3.
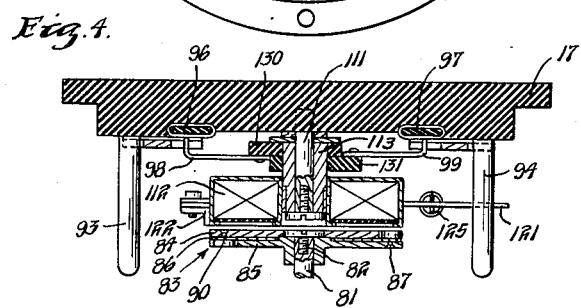
Fig. 4.
Fig. 5.
INVENTOR.
PAUL F. SHIVERS
BY
George H. Fisher
ATTORNEY Patented Sept. 9, 1952

2,609,615

UNITED STATES PATENT OFFICE 2,609,615

GYROSCOPIC INSTRUMENT

Paul F. Shivers, Edina, Minn., assignor to Minneapolis-Honeywell Regulator Company, Minneapolis, Minn., a corporation of Delaware Application September 26, 1945, Serial No. 618,677

4 Claims. (Cl. 33—204)

This invention relates to the field of aircraft instruments, and particularly to such instruments in which the natural properties of gyroscopes are utilized to provide a standard of azimuth with respect to which the course of a craft may be compared. While instruments of this type are broadly known, it is an object of my invention to provide in such an instrument novel features of construction which will make its use more convenient, its adjustment more simple, and its maintenance easier and more rapid.

It is another object of my invention to provide a directional gyroscope having improved releasably actuated self-centering electrically responsive control members.

It is another object of my invention to provide a directional gyroscope having a graduated scale and improved illuminating means therefor.

It is another object of my invention to provide a directional gyroscope having a graduated scale and improved means for adjusting the scale to a desired reading while the gyroscope is in operation.

A further object of this invention is to provide a directional gyroscope having a readily removable member carrying all elements requiring frequent servicing or adjustment.

A still further object of my invention is to provide a directional gyroscope having improved releasably actuated self-centering electrically responsive remote control members such as potential dividers, together with a graduated scale, a readily removable member carrying all elements requiring frequent servicing or adjustment, and improved means for adjusting a novelly illuminated scale to a desired reading while the gyroscope is in operation.

Various other objects, advantages, and features of novelty which characterize my invention are pointed out with particularity in the claims annexed hereto and forming a part hereof. However, for a better understanding of the invention, its advantages and objects attained by its use, reference should be had to the subjoined drawing, which forms a further part hereof, and to the accompanying descriptive matter, in which I have illustrated and described a preferred embodiment of my invention.

In the drawings:

Figure 3 is a bottom view of the removable cover member shown in Figure 1;

Figure 4 is a cross-sectional view of the member shown in Figure 3, the section being taken along the line 4—4 in Figure 3;

Figure 5 is a fragmentary view of a portion of the device shown in Figures 3 and 4.

Figure 1:
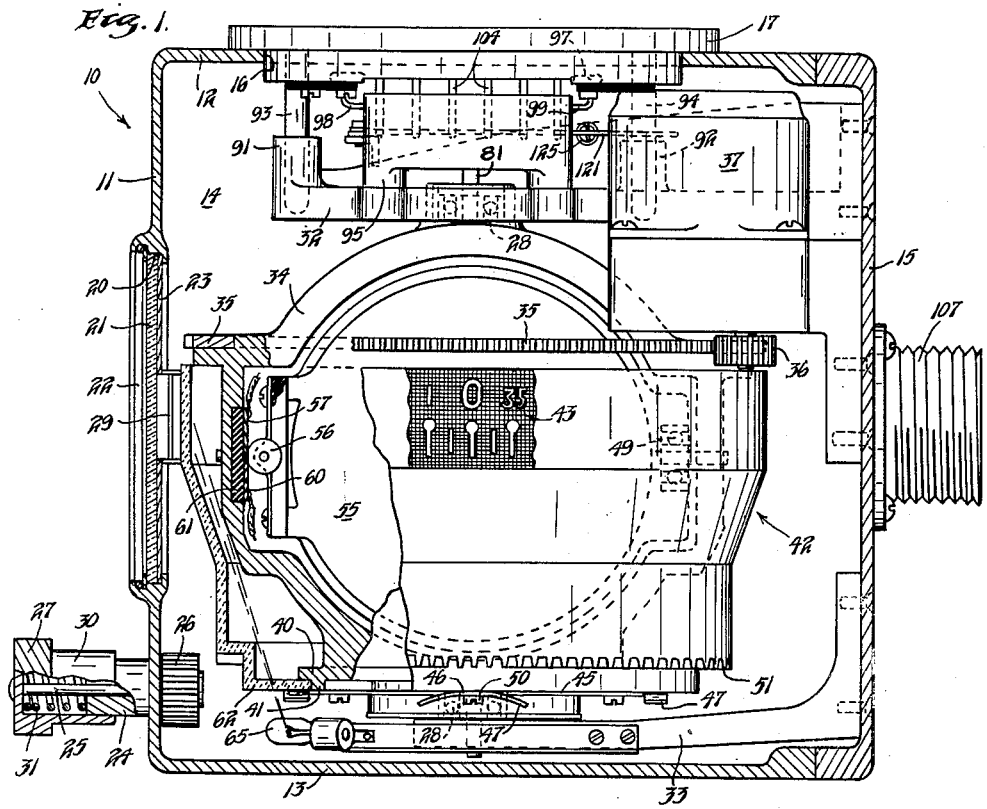
Figure 1 is a generally elevational view of the instrument, partly in section, with certain other parts broken away for clarity of illustration.

Referring now to Figure 1, it will be seen that my gyroscope is mounted in a casing 10 including a front wall 11, a top 12, a bottom 13, and side walls 14 which, for convenience, have been made unitary, and a rear wall 15 upon which the instrument is primarily mounted. Top 12 has an opening 16 which is closed by a removable member 17, the latter being held in place by any suitable means, not shown, such as machine screws.

The front wall 11 of casing 10 is provided with an opening 20 in which a transparent disk 21 is maintained by a snap ring 22. A masking member 23, provided with a central index 29, is located behind transparent member 21 for cooperating with a graduated scale presently to be described. Wall 11 is also provided with a boss 24, which is traversed by a shaft 25 bearing on its inner end a gear 26 and on its outer end a knob 27. Knob 27 is provided with an apron 30 in telescoping relation with boss 24, and knob 27, shaft 25, and gear 26 are assembled into a unitary structure which is capable of movement both axially and angularly. Inward axial movement of this structure is opposed by a spring 31.

Rear wall 15 is mounted to casing 10 by suitable means not disclosed, and supported by wall 15 are an upper bracket 32 and a lower bracket 33. Mounted in bearings 28 in brackets 32 and 33, for rotation about a normally vertical axis, is a gimbal ring 34.

Mounted on gimbal ring 34 and arranged coaxially about the vertical axis is a ring gear 35. This gear engages a pinion 36 carried by the shaft of a motor 37 which is also supported from back wall 15. Energization of motor 37 is thus effective to apply to gimbal ring 34 a torque acting about its vertical axis.

The bottom of gimbal ring 34 is in the shape of a ring 40 so arranged as to be parallel with ring gear 35. Ring 40 is provided with an annular shoulder 41, and frictionally engaging the ring and shoulder is a cup-shaped member 42 of light-transmitting material. The upper outer rim of member 42 carries a translucent scale of azimuth 43 on an opaque background of such a nature that if the scale is illuminated with light falling upon the scale from within the cup-shaped member, the indications are plainly visible from the outside. Member 42 is maintained in proper relationship with ring 40 and shoulder 41 by a spring member 44 comprising in general an annular portion 45 and four projecting arms 46 having deformed end portions 47, the whole being fastened to ring 40 by means of suitable machine screws 50. Arms 46 are so formed that when screws 50 are tightened a desirable degree of frictional contact is maintained between member 42 and ring 40.

Member 42 is also provided with a downwardly projecting gear portion 51, which is so located when the device is assembled as to cooperate with gear 26 when shaft 25 is pushed inwardly. Under these conditions, rotation of knob 27 is effective to rotate member 42 about the vertical axis of the gimbal ring 34, and if gimbal ring 34 is maintained fixed in azimuth, member 42 slips with respect thereto through the frictional connection just described.

Figure 2:
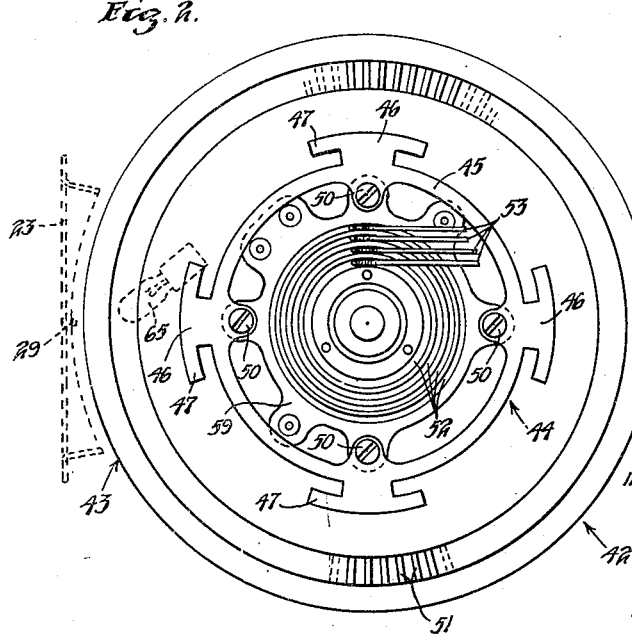
Figure 2 is a generally bottom view of that portion of the instrument shown in Figure 1 contained within the casing.

Also supported upon ring 40 by machine screws 50 is a disk 59 of insulating material carrying a plurality of slip rings 52 for conducting electrical current from the casing to the gimbal ring regardless of the position of the gimbal ring about its vertical axis. Slip rings 52 are energized by brushes 53 which are carried by and insulated from bracket 33, which has not been shown in Figure 2 to avoid unnecessarily complicating the figure. The portion of the simplified circuit energized through slip rings 52 and carried by gimbal ring 34 is shown within dotted box 54 in Figure 6 and will be discussed more fully below.

Pivotally mounted in gimbal ring 34 for rotation in bearings 49, only one of which is shown, about a horizontal axis lying in the plane of the paper and perpendicular to the vertical axis of ring 34 is a housing 55 containing a conventional gyroscope rotor including an electric motor for maintaining it in continuous high speed rotation. To avoid complicating the drawing, the housing 55 is not broken away to show the rotor contained within it.

Carried by housing 55 is a resiliently mounted conducting roller 56 which is insulated from the housing and which may make contact with either one of a pair of contact plates 57 and 60 if displaced from its normal position. Plates 57 and 60 are mounted in spaced relation on an insulating member 61, which projects between them to comprise a compound plane surface. Roller 56 and plates 57 and 60 are displaced from the axis of rotation of housing 55 in gimbal ring 34. The roller rests on the insulating strip between the plates if the housing is in its normal position, while if the housing is tilted in either direction about bearings 49, the roller contacts one of the plates and therefore completes one or the other of two electrical circuits.

The bottom 62 of member 42 is transparent, and mounted beneath it on bracket 33 is a panel lamp 65. The arrangement, relation, and configuration of the various parts are such that a direct path is available for a beam of light from the filaments of lamp 65 to the inside of scale 43 on member 42. As suggested in the dotted lines in Figure 2, member 23 is so shaped that it conforms very closely to the outline of member 43 when the instrument is assembled, and thus prevents the passage of extraneous light to scale 43.

Referring to Figure 4, a shaft 81 extends upwardly along the axis of ring 34 and is unitary therewith. Mounted on shaft 81 by a set screw 82 is a flexible coupling member 83 comprising upper and lower disks 84 and 85 of a ferro-magnetic material and an intermediate leaf 86. As shown in more detail in Figure 5, leaf 86 is riveted to member 85 near its periphery by rivets 87, and to member 84 in a similar fashion by rivets 90. By this structure it is possible to provide for a certain amount of axial movement of member 84 with respect to member 85 although rotational movement between the two members is prevented.

In Figure 1, bracket 32 is shown as including a pair of sockets 91 and 92 arranged to receive a pair of pins 93 and 94, respectively, projecting downwardly from cover 17. Bracket 32 is also shown as supporting a multiple connector 95 for making electrical connection between casing 10 and circuit elements supported on cover 17. As shown in Figures 3 and 4, pins 93 and 94 are suitably embedded in cover 17, which also supports a pair of intertapped resistance windings 96 and 97 which together with a pair of sliders 98 and 99 comprise means for deriving electrical signals from the instrument, in a fashion presently to be described, for the purpose of actuating such a control or indicating device as may be desired. A plurality of contacting pins 104 are embedded in cover 17 and arranged for cooperating with the sockets in member 95 shown in Figure 1 to make quickly releasable connections between the windings, and their sliders, and a conventional multiple connector 107 carried on the back wall of casing 10.

A pivot 111 is shown as embedded in cover 17, and pivotally supported thereon is a solenoid 112, deriving its energy from two of the pins 104 under the control of a circuit external to the instrument and connected thereto through connector 107. When cover 17 is assembled to the completed instrument, solenoid 112 is aligned with coupling member 83, so that upon energization of the solenoid, member 84 moves into magnetic engagement with the solenoid. Any relative movement between gimbal ring 34 and casing 10 therefore results in rotation of solenoid 112 with respect to cover 17.

A pair of arms 120 and 121 are pivotally connected to solenoid 112 as at 122 and contact opposite sides of pin 94 as at 123 and 124. A small spring 125 connects arms 120 and 121 so that in the absence of any other force solenoid 112 orients itself with respect to pin 94. Any rotating force supplied to solenoid 112 through flexible coupling 83, however, is effective to rotate the solenoid against spring 125, regardless of the direction of the force.

As shown in Figure 4, sliders 98 and 99 are mounted upon and insulated from the core 113 of solenoid 112 by insulating bracket members 130 and 131.

Operation

Figure 6:
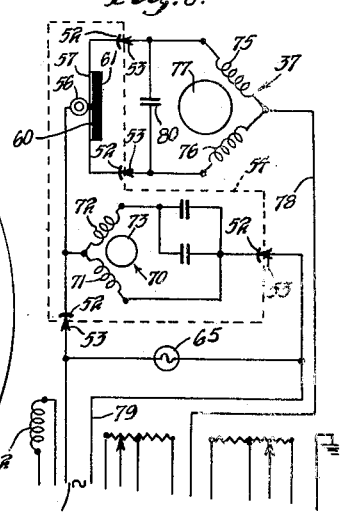
Figure 6 is a schematic wiring diagram of the electrical system used in this instrument.

Referring to Figure 6, it will be seen that a motor 70 having field windings 71 and 72 and an armature 73 is energized from a suitable source 74 of alternating current through a pair of the brushes 53 and collector rings 52. To bring about the desired rotating field, a capacitance is connected in series with one of the windings, and in order to make it possible to balance the gyro housing the capacitance is embodied in two capacitors, one to be mounted on each side of an axis of the gyroscope. It will be understood that motor 70 comprises the source of power for maintaining the rotor of the gyro in continuous high speed rotation.

The second motor shown in Figure 6 is servomotor 37 which also comprises a condenser motor including windings 75 and 76, a rotor 77, and a capacitor 80. Motor 37 is energized by means external to the gyroscope which connects conductor 78 from the motor to conductor 79 from the source of alternating voltage, to perform its function in a conventional reversing motor-control circuit controlled by the position of roller 56 with respect to plates 57 and 60. When roller 56 is in contact with plate 60, winding 76 of motor 37 is energized directly through a pair of the collector rings and brushes 53, while winding 75 is energized in the same manner through a condenser 80. The necessary rotating field therefore is set up for operation of rotor 77 in a first direction. On the other hand, if roller 56 contacts plate 57, then winding 75 is energized directly while winding 76 is energized through condenser 80, and the rotating field is set up for energizing rotor 77 to operate in the opposite direction.

In the use of my invention the instrument is mounted on the instrument board of an aircraft so that the indications are visible to the pilot, and so that the axis of rotation of gimbal ring 34 is vertical when the craft is in the position of level flight. Suitable electrical connections are made to connector 107 to permit energization of the rotor motor, the servomotor, and the solenoid, and to connect the resistance windings and sliders in appropriate electrical circuits as may be desired. The circuit is first completed energizing the rotor of the gyroscope, and lamp 63 may conveniently be illuminated at the same time. It will be appreciated that while the gyroscope is coming up to speed, it is not possessed of the necessary energy to perform its function, nor will it at first have sufficient energy to remain particularly stable in any position as it accelerates. Accordingly, during this warming-up period solenoid 112 is maintained deenergized and therefore the gyroscope is not effective to control the position of sliders 98 and 99 with respect to the windings of the potential dividers. The sliders accordingly remain at their central positions under the influence of spring 125. The circuit to the servomotor is also maintained deenergized during the early warming-up period.

As the gyroscope rotor approaches its normal speed, the circuit to servomotor 37 is independently completed externally of the gyroscope. Under ordinary conditions, a greater or a less amount of movement of the aircraft has taken place since last the gyroscope was energized, and this together with the effect of starting the rotor usually results in a condition of the instrument, when the servomotor is energized, in which the axis of rotation is not horizontal. This means that roller 56 is in contact with plate 57 or plate 60, which results in energizing motor 37 in a first or second sense depending upon which of the plates is contacted by the roller. Energization of motor 37 is effective to supply a torque to ring gear 35 through pinion 36, and this in turn results in precessive movement of the gyroscope about the axis pivotally mounting the housing in the gimbal ring. This precessive movement continues until roller 56 moves off the conducting plate in question to the central insulating strip, when energization of the servomotor is interrupted.

If the craft is now in level flight, any changes in the heading of the craft will result in the movement of the index with respect to the scale so that changes in the reading of the instrument are observed by the pilot. In order to coordinate the indications of the instrument with the desired course, the heading of the craft is maintained as desired while knob 27 is pressed inwardly until gear 26 engages with gear 51. Rotation of knob 27 is thereafter effective to rotate member 42 about the vertical axis of the gyroscope, and this is continued until the instrument indicates zero or such other reading as the pilot desires.

The spring member 44 continuously holds the member 42 in frictional engagement with ring 40 during the entire time that member 42 is being rotated and prevents separation of member 42 from ring 40 during such resetting operation. Due to the frictional engagement between member 42 and ring 40, the operation of knob 27 applies a torque to gimbal ring 34 tending to rotate it about the vertical axis, and to carry the gyroscope with it. Any movement of the gyroscope, however, must take place precessively about the pivotal axis of the housing, thus displacing roller 56 to contact one of the plates and to energize servomotor 37. The servomotor applies a torque to ring 35 opposite to that applied to the knob 27; the power output of motor 37 is greater than the frictional force between member 42 and ring 40. Gimbal ring 34 and ring gear 35 are thus maintained fixed about the vertical axis of the gimbal ring, and the graduated member is frictionally moved with respect to the gimbal ring until the desired indication is attained.

By providing this method of adjusting the instrument, it will be obvious that any need for caging the gyroscope during adjustment of the reading is obviated. This means that the gyroscope is in full control of the instrument at all times even during the adjustment of the setting, and that complicated and troublesome caging mechanisms are eliminated.

Having once set the instrument to the desired course, solenoid 112 is energized externally of the instrument. This results in the attraction of disk 84 into intimate magnetic contact with the solenoid, so that any relative movement between the housing and the vertical shaft of the gyroscope appears as rotation of the solenoid with respect to the cover, and therefore as movement of the sliders with respect to the resistance windings. It will of course be appreciated that as such displacement takes place, spring 125 is extended and this in turn effects a rotating torque upon the gyroscope about its vertical axis, but this is immediately opposed as previously described by the effect of servomotor 37 and the gyroscope retains its accuracy.

It will also be immediately apparent that this instrument is not designed for control of sliders 98 and 99 with respect to their windings throughout a 360° turn of the craft in azimuth, but rather to a control of the sliders in response to small deviations of the craft in one direction or the other from a predetermined or zero course. If it is desired to make a turn of considerable magnitude, or to change the course permanently by even a small angle, solenoid 112 is deenergized, thus releasing the control of the gyroscope over the sliders which are recentered by spring 125 if they are out of center, and when the new course is attained the solenoid is once more energized so that the control of the gyroscope over the potential dividers is again established.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matter of shape, size and arrangement of parts, within the principle of the invention, to the full extent indicated by the broad general meaning of the terms in which the appended claims are expressed.

I claim as my invention:

1. In a device of the class described, in combination: a gyroscope having a spin axis and cardanic mounting means; a casing means enclosing and supporting said cardanic mounting and said gyroscope; a removable cover for said casing; means carried by said cardanic mounting means for altering the condition of energization of an electric circuit in response to departure of said spin axis from a normal orientation; signal producing means carried by said cover; means releasably coupling said signal producing means to said cardanic mounting means and actuating said signal producing means through movement of said cardanic mounting means; said coupling comprising a ferro-magnetic member and an electrically energizable member; and means mounting said ferro-magnetic member in angularly rigid and axially movable relationship to one of the axes of said cardanic mounting means.

2. In a device of the class described, in combination: a gyroscope having a spin axis and cardanic means mounting said gyroscope for a predetermined nomal orientation of said axis; a casing for said gyroscope and cardanic means; means including a motor means for applying a torque between said casing and said cardanic mounting means; means responsive to a departure of said axis from said normal orientation for controlling said motor means to precessibly return said axis to said normal orientation; an indicating member directly mounted on said cardanic mounting means in frictional engagement therewith, said indicating means being graduated and provided with indicia indicating angular displacement; means for continuously holding said indicating member in operative frictional engagement with said cardanic mounting means with sufficient force that said indicating member can not be slid with respect to said cardanic mounting means without an appreciable tendency toward precessional movement of said gyroscope; an index carried by said casing for visual cooperation with said graduations on said indicating member; and means mounted on said casing and adapted to selectively engage said indicating member without interrupting the gyroscopic stability of the gyroscope and rotate the indicating member against the restraining effect of said frictional engagement so as to cause sliding relative movement between said indicating member and said cardanic mounting means, said motor means having a torque output sufficient to overcome said frictional engagement between said indicating member and said cardanic mounting means to maintain said gyroscope in a substantially normal operation in its predetermined orientation.

3. In a device of the class described, in combination: a gyroscope having a spin axis and cardanic means mounting said gyroscope for a predetermined normal oientation of said axis; a casing for said gyroscope and cardanic means; means including a motor means for applying a torque between said casing and said cardanic mounting means; means responsive to a departure of said axis from said normal orientation for controlling said motor means to precessibly return said axis to said normal orientation; a cylindrical indicating member surrounding and directly mounted on said cardanic mounting means in frictional engagement therewith adjacent the periphery of the cardanic means, said indicating means being graduated and provided with indicia indicating angular displacement; means for continuously holding said indicating member in operative frictional engagement with said cardanic mounting means with sufficient force that said indicating member can not be slid with respect to said cardanic mounting means without an appreciably tendency toward precessional movement of said gyroscope; an index carried by said casing for visual cooperation with said graduations on said indicating member; and means mounted on said casing and adapted to selectively engage said indicating member without interrupting the gyroscopic stability of the gyroscope and rotate the indicating member against the restraining effect of said frictional engagement so as to cause sliding relative movement between said indicating member and said cardanic mounting means, said motor means having a torque output sufficient to overcome said frictional engagement between said indicating member and said cardanic mounting means to maintain said gyroscope in a substantially normal operation in its predetermined orientation.

4. In a device of the class described, in combination: a gyroscope having a spin axis and cardanic means mounting said gyroscope for a predetermined normal orientation of said axis; a casing for said gyroscope and cardanic means; means including a motor means for applying a torque between said casing and said cardanic mounting means; means responsive to a departure of said axis from said normal orientation for controlling said motor means to precessibly return said axis to said normal orientation; a cylindrical, light transmitting, indicating member surrounding and directly mounted on said cardanic mounting means in frictional engagement therewith adjacent the periphery of the cardanic means, said indicating means being graduated and provided with indicia indicating angular displacement; means for continuously holding said indicating member in operative frictional engagement with said cardanic mounting means with sufficient force that said indicating member can not be slid with respect to said cardanic mounting means without an appreciable tendency towards precessional movement of said gyroscope; an index carried by said casing for visual cooperation with said graduations on said indicating member; means mounted on said casing and adapted to selectively engage said indicating member without interrupting the gyroscopic stability of the gyroscope and rotate the indicating member against the restraining effect of said frictional engagement so as to cause sliding relative movement between said indicating member and said cardanic mounting means, said motor means having a torque output sufficient to overcome said frictional engagement between said indicating member and said cardanic mounting means to maintain said gyroscope in a substantially normal operation in its predetermined orientation; and light means located within said casing and so positioned with respect to said indicating member that the same is illuminated as from within.

PAUL F. SHIVERS.

REFERENCES CITED

The following references are of record in the file of this patent:

UNITED STATES PATENTS

| Number | Name | Date |
|---|---|---|
| 1,642,087 | Rosenbaum | Sept. 13, 1927 |
| 1,757,096 | Sperry | May 6, 1930 |
| 2,018,536 | Salzgeber | Oct. 22, 1935 |
| 2,220,055 | Fischel et al. | Oct. 29, 1940 |
| 2,229,033 | Bates | Jan. 21, 1941 |
| 2,321,543 | Carlson | June 8, 1943 |
| 2,363,495 | Bates | Nov. 28, 1944 |
| 2,406,341 | Beach et al. | Aug. 27, 1946 |
| 2,414,448 | Carter | Jan. 21, 1947 |
| 2,416,646 | Rylsky | Feb. 25, 1947 |

FOREIGN PATENTS

| Number | Country | Date |
|---|---|---|
| 522,207 | Great Britain | June 12, 1940 |